United States Patent
Li et al.

(10) Patent No.: US 11,777,402 B2
(45) Date of Patent: Oct. 3, 2023

(54) PRECHARGE SYSTEM AND METHOD

(71) Applicant: Delta Electronics (Shanghai) Co., Ltd., Shanghai (CN)

(72) Inventors: Zhichao Li, Shanghai (CN); Shouyan Wang, Shanghai (CN); Jian Jiang, Shanghai (CN); Yunfeng Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 33 days.

(21) Appl. No.: 17/494,998

(22) Filed: Oct. 6, 2021

(65) Prior Publication Data

US 2022/0416647 A1 Dec. 29, 2022

(30) Foreign Application Priority Data

Jun. 25, 2021 (CN) .......................... 202110710247.2

(51) Int. Cl.
*H02M 1/32* (2007.01)
*H02M 7/06* (2006.01)

(52) U.S. Cl.
CPC ............... *H02M 1/32* (2013.01); *H02M 7/06* (2013.01)

(58) Field of Classification Search
CPC ............................ H02M 1/36; H02M 7/02–28
See application file for complete search history.

(56) References Cited

U.S. PATENT DOCUMENTS

| 7,528,574 | B1* | 5/2009 | Adkins | H02J 7/0071 |
|   |   |   |   | 320/128 |
| 9,906,160 | B2* | 2/2018 | Ackermann | H02M 7/125 |
| 10,027,223 | B1* | 7/2018 | Zhang | H02M 3/07 |
| 2009/0247100 | A1* | 10/2009 | Meltzer | H03D 1/06 |
|   |   |   |   | 455/313 |
| 2020/0274385 | A1* | 8/2020 | Saito | H02M 1/36 |

FOREIGN PATENT DOCUMENTS

| CN | 206628973 U | 11/2017 |
| CN | 111289870 A | 6/2020 |
| EP | 3700053 A1 | 8/2020 |

* cited by examiner

*Primary Examiner* — Peter M Novak
(74) *Attorney, Agent, or Firm* — KIRTON McCONKIE; Evan R. Witt (57) ABSTRACT

A precharge system and method are provided. The precharge system comprises a load circuit, a precharge circuit and a control circuit. The load circuit comprises an input terminal, an input switch and a bus capacitor. The precharge circuit comprises a precharge resistor and a precharge switch. The precharge method comprises: during the load circuit being in a precharge mode, controlling the input switch to be in an off state, and controlling the precharge switch to switch between the on and off state for multiple times; and during the load circuit being in a work mode, controlling the input switch to be in an on state. During the load circuit being in the precharge mode, when the precharge switch is in the on state, a consuming power of the precharge resistor is larger than a threshold power and is smaller than or equal to a limit power of the precharge resistor.

22 Claims, 7 Drawing Sheets

PRECHARGE SYSTEM AND METHOD

CROSS-REFERENCE TO RELATED APPLICATION

This application claims priority to China Patent Application No. 202110710247.2, filed on Jun. 25, 2021, the entire contents of which are incorporated herein by reference for all purposes.

FIELD OF THE INVENTION

The present disclosure relates to power electronical technology field, and more particularly to a precharge system and method.

BACKGROUND OF THE INVENTION

Figure 1:
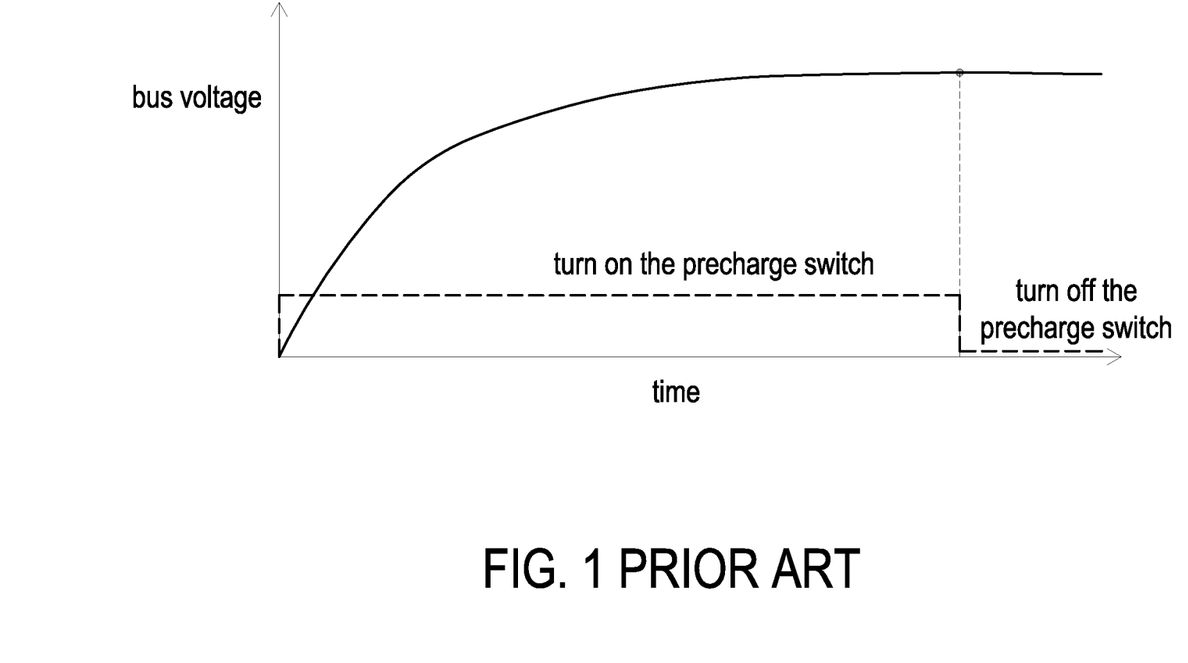
FIG. 1 is a schematic oscillogram showing a waveform of bus capacitor and a switching sequence of precharge switch in the case of employing the conventional precharge method.

For avoiding the overcurrent phenomenon on bus capacitors during the start-up process, the precharge circuit is utilized to precharge the bus capacitor. Generally, the precharge circuit comprises a precharge switch and a precharge resistor. In the conventional precharge method, as shown in FIG. 1, during precharging the bus capacitor, the precharge switch is controlled to be turned on constantly for charging the bus capacitor continuously. After the bus voltage on the bus capacitor reaches a preset value or the precharge switch has been turned on for a preset time length, the precharge switch is turned off to finish the precharging.

Figure 2:
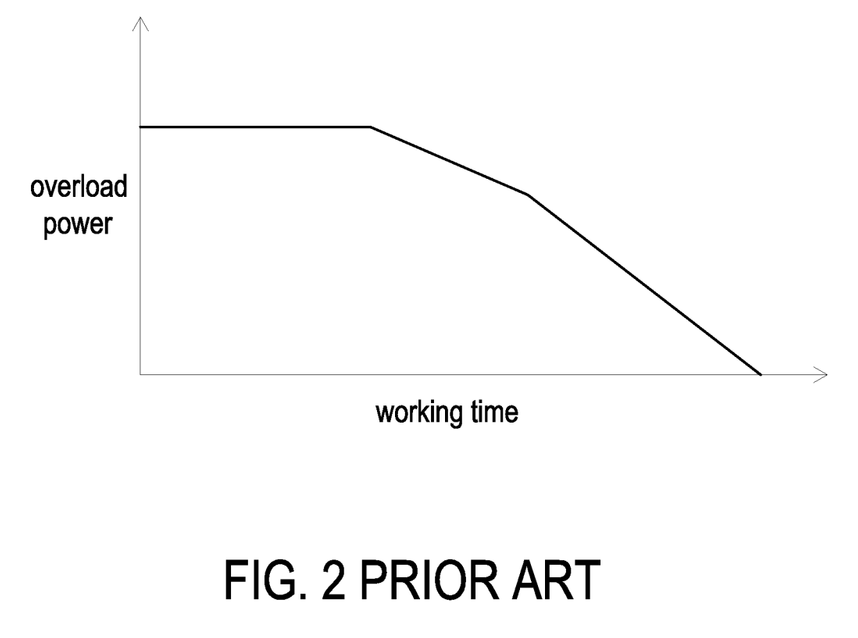
FIG. 2 is a schematic view showing the relation between an overload power and a working time of a resistor.

However, during the precharging process, since the precharge switch is maintained in an on state, the precharge resistor works and consumes the power continuously. Moreover, as shown in FIG. 2, the overload ability of the resistor is inversely proportional to the time of the resistor working with load. Therefore, as the working time of the precharge resistor increases, the overload ability of the precharge resistor decreases gradually, namely the overload power of the precharge resistor decreases gradually.

Based on the conventional precharge method and the resistor characteristic stated above, the conventional precharge circuit has to employ the precharge resistor with large rated power. Accordingly, the type of the precharge resistor is limited, and the volume and cost of the precharge resistor are increased.

Therefore, there is a need of providing a precharge system and method in order to overcome the drawbacks of the conventional technologies.

SUMMARY OF THE INVENTION

The present disclosure provides a precharge system and method. Through controlling the precharge switch to switch between an on state and an off state for multiple times, the precharge resistor intermittently works with a consuming power which is close to a limit power. Therefore, the precharge system is allowed to employ the precharge resistor with low rated power so as to reduce the volume and cost of the precharge resistor, and it is faster for the precharge system to complete the precharging.

In accordance with an aspect of the present disclosure, a precharge method configured to control a precharge system is provided. The precharge system comprises a load circuit and a precharge circuit, and the load circuit comprises an input terminal, an input switch and a bus capacitor. The input terminal is configured to receive an input current. The input switch is coupled between the input terminal and the bus capacitor. The precharge circuit is connected in parallel to the input switch and comprises a precharge resistor and a precharge switch connected in series. The precharge method comprises: during the load circuit being in a precharge mode, controlling the input switch to be in an off state, and controlling the precharge switch to switch between an on state and an off state for multiple times; and during the load circuit being in a work mode, controlling the input switch to be in an on state. During the load circuit being in the precharge mode, when the precharge switch is in the on state, a consuming power of the precharge resistor is larger than a threshold power and is smaller than or equal to a limit power of the precharge resistor, the input current flows through the precharge resistor to charge the bus capacitor, and a bus voltage on the bus capacitor increases. When the precharge switch is in the off state, the consuming power of the precharge resistor is zero, and the bus capacitor stops being charged.

In accordance with another aspect of the present disclosure, a precharge system is provided. The precharge system comprises a load circuit, a precharge circuit and a control circuit, and the load circuit comprises an input terminal, an input switch and a bus capacitor. The input terminal is configured to receive an input current. The input switch is coupled between the input terminal and the bus capacitor. The precharge circuit is connected in parallel to the input switch and comprises a precharge resistor and a precharge switch connected in series. During the load circuit being in a precharge mode, the control circuit controls the input switch to be in an off state and controls the precharge switch to switch between an on state and an off state for multiple times. When the precharge switch is in the on state, a consuming power of the precharge resistor is larger than a threshold power and is smaller than or equal to a limit power of the precharge resistor, the input current flows through the precharge resistor to charge the bus capacitor, and a bus voltage on the bus capacitor increases. When the precharge switch is in the off state, the consuming power of the precharge resistor is zero, and the bus capacitor stops being charged. During the load circuit being in a work mode, the control circuit controls the input switch to be in an on state.

The present disclosure provides a precharge system and method. Through controlling the precharge switch to switch between an on state and an off state, the precharge resistor intermittently works with a consuming power which is larger than a threshold power and is smaller than or equal to a limit power. Accordingly, when the precharge resistor works, the consuming power of the precharge resistor is maintained at a power level which is close to the limit power. Therefore, the precharge system is allowed to employ the precharge resistor with low rated power so as to reduce the volume and cost of the precharge resistor, and it is faster for the precharge system to complete the precharging. In addition, since the precharge resistor dissipates heat intermittently, the reliability of the overall system is improved.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 3:
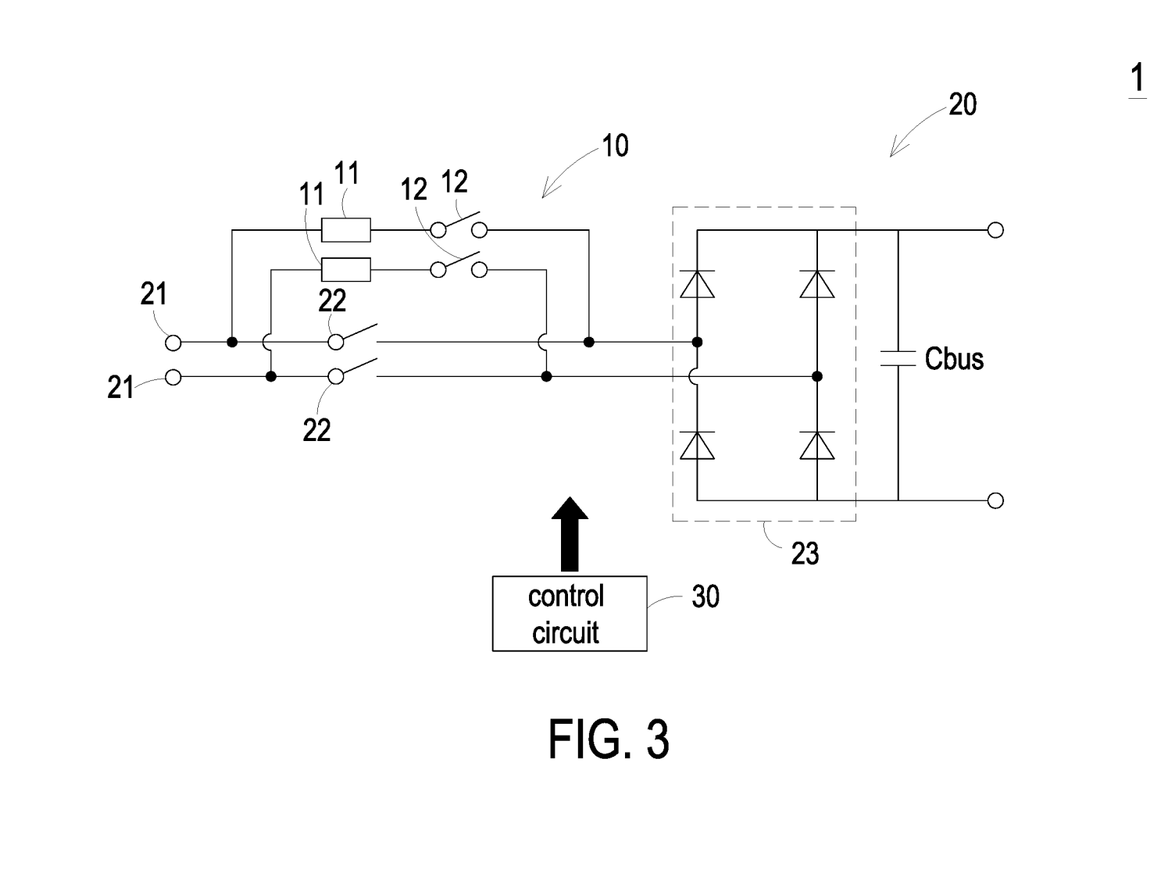
FIG. 3 is a schematic circuit diagram illustrating a precharge system according to an embodiment of the present disclosure.

FIG. 3 is a schematic circuit diagram illustrating a precharge system according to an embodiment of the present disclosure. As shown in FIG. 3, the precharge system 1 comprises a precharge circuit 10 and a load circuit 20, and the load circuit 20 comprises an input terminal 21, an input switch 22 and a bus capacitor Cbus. The input terminal 21 is configured to receive an input current. The input switch 22 is coupled between the input terminal 21 and the bus capacitor Cbus. The precharge circuit 10 is connected in parallel to the input switch 22, and the precharge circuit 10 comprises a precharge resistor 11 and a precharge switch 12 connected in series. The input current can be a direct current, and the direct current is used to charge the bus capacitor Cbus. In an embodiment, the input current is an alternating current (i.e., the input terminal 21 is connected to an alternating current source), and the load circuit 20 further comprises a rectifier circuit 23. The rectifier circuit 23 is coupled between the input switch 22 and the bus capacitor Cbus, and is configured to convert the alternating current into a direct current for charging the bus capacitor Cbus. In FIG. 3, the load circuit 20 is exemplified as a two-phase circuit. In this embodiment, the load circuit 20 comprises two input switches 22, the precharge system 1 comprises two precharge circuits 10, and the two precharge circuits 10 are connected in parallel to the two input switches 22 respectively. In fact, the number of phases of the load circuit 20 is not limited, the load circuit 20 is for example but not limited to a single-phase, two-phase or three-phase circuit. When the number of phases of the load circuit 20 changes, the number of the input switch 22 and the precharge circuit 10 changes accordingly. In addition, the precharge system 1 further comprises a control circuit 30. The control circuit 30 is electrically connected to the load circuit 20 and the precharge circuit 10 and is configured to control the operation of the precharge system 1. It is noted that the precharge method described as follows in the present disclosure are all performed by the control circuit 30 for controlling the operation of the precharge system 1 accordingly.

Figure 4:
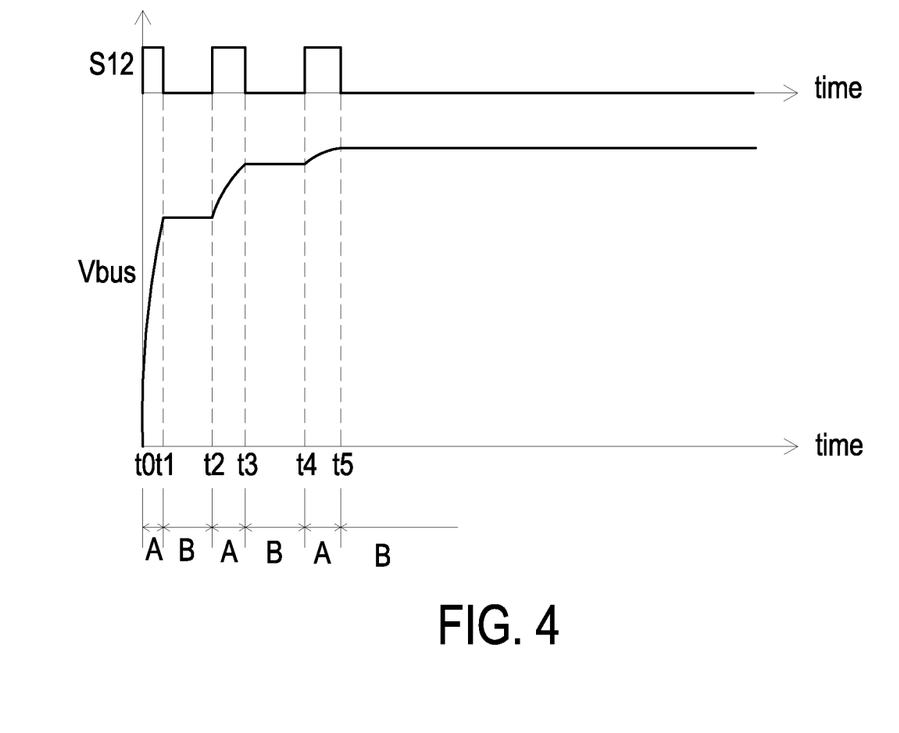
FIG. 4 is a schematic oscillogram showing waveforms of a driving signal of a precharge switch and a bus voltage of FIG. 3.
Figure 5:
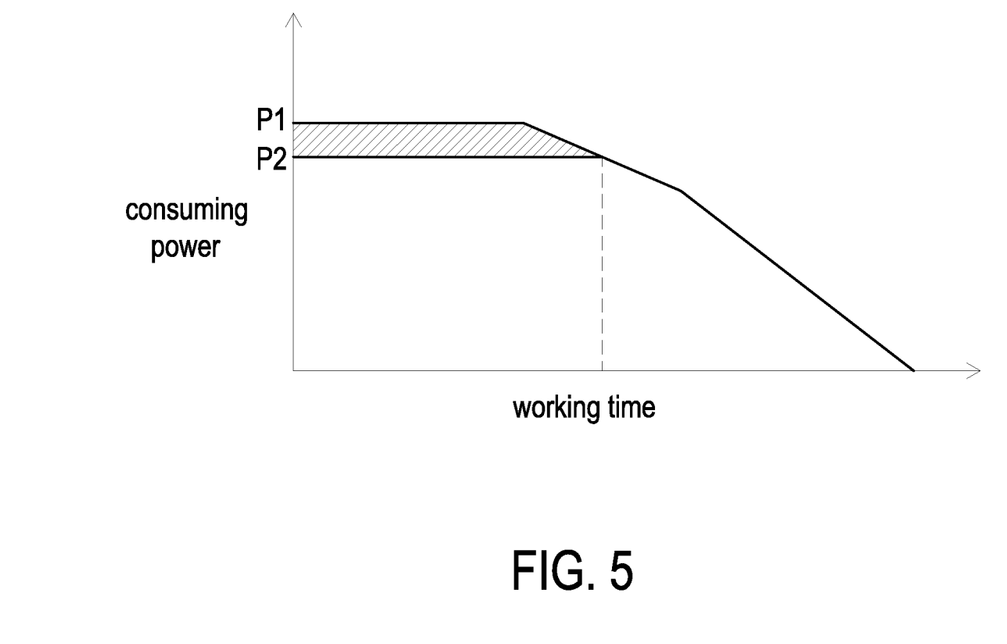
FIG. 5 is a schematic view showing the relation between the consuming power and the working time of the precharge resistor of FIG. 3.

FIG. 4 and FIG. 5 are exemplified to explain the precharge method for controlling the precharge system 1 of the present disclosure. In FIG. 4, S12 is the driving signal of the precharge switch 12, and Vbus is the bus voltage on the bus capacitor Cbus. As shown in FIG. 4, during the time period from the timing t0 to t5, the load circuit 20 is in a precharge mode, the input switch 22 is controlled to be in the off state, and the precharge switch 12 is controlled to switch between the on state and the off state for multiple times. After the timing t5, the load circuit 20 is in a work mode, and the input switch 22 is controlled to be in the on state. Further, when the load circuit 20 is in the work mode, the precharge switch 12 may be controlled to be in the off state or the on state. The operation of the precharge system 1 during the load circuit 20 being in the precharge mode is described particularly as follows.

At the timing t0, the precharge switch 12 is turned on. During the time period from the timing t0 to t1, the precharge switch 12 is in the on state, the input current flows through the precharge resistor 11 and charges the bus capacitor Cbus, and thus the bus voltage Vbus increases. At the timing t1, the precharge switch 12 is turned off. During the time period from the timing t1 to t2, the precharge switch 12 is in the off state, the bus capacitor Cbus stops being charged, and the bus voltage Vbus is constant. In an embodiment, the bus voltage Vbus may decrease slightly. Please refer to FIG. 4 and FIG. 5. FIG. 5 is a schematic view showing the relation between the consuming power and the working time of the precharge resistor 11, and the actual work region of the precharge resistor 11 is illustrated by a shadow part in FIG. 5. At the timing t0, the consuming power of the precharge resistor 11 is equal to the limit power P1. In an embodiment, at the timing t0, the consuming power of the precharge switch 11 can be any value which is smaller than the limit power P1 and is larger than a threshold power P2. The limit power P1 is larger than the rated power of the precharge resistor 11. During the time period from the timing t0 to t1, the precharge switch 12 is in the on state for allowing the precharge resistor 11 to work. As the working time of the precharge resistor 11 increases, the thermal energy is gradually accumulated within the precharge resistor 11, which causes a permitted maximum of the consuming power of the precharge resistor 11 gradually decreases toward the threshold power P2. It is noted that the consuming power of the precharge resistor 11 is maintained to be larger than the threshold power P2 and to be smaller than or equal to the limit power P1 during the time period from the timing t0 to t1. During the time period from the timing t1 to t2, the precharge switch 12 is in the off state, and the precharge resistor 11 stops working. Under this circumstance, the consuming power of the precharge resistor 11 is zero so that the precharge resistor 11 can dissipate heat for making itself return to be close to the initial status, and the permitted maximum of the consuming power of the precharge resistor 11 gradually increases toward the limit power P1. In an embodiment, the permitted maximum of the consuming power of the precharge resistor 11 may return to equal the limit power P1.

Afterwards, at the timing t2, the consuming power of the precharge resistor 11 is equal to the limit power P1 again. In an embodiment, the consuming power of the precharge resistor 11 at the timing t2 may be any value which is slightly smaller than the limit power P1 and is larger than the threshold power P2. During the time period from the timing t2 to t3, the precharge switch 12 is in the on state, the bus capacitor Cbus is charged, the bus voltage Vbus increases, and the precharge resistor 11 works again. As the working time of the precharge resistor 11 increases, the thermal energy is gradually accumulated within the precharge resistor 11, which causes the permitted maximum of the consuming power of the precharge resistor 11 gradually decreases toward the threshold power P2 again. During the time period from the timing t2 to t3, the consuming power of the precharge resistor 11 is maintained to be larger than the threshold power P2 and to be smaller than or equal to the limit power P1. During the time period from the timing t3 to t4, the precharge switch 12 is in the off state, and the precharge resistor 11 stops working. Under this circumstance, the consuming power of the precharge resistor 11 is zero so that the precharge resistor 11 dissipates heat for making itself return to be close to the initial status again, namely the permitted maximum of the consuming power of the precharge resistor 11 gradually increases toward the limit power P1. In an embodiment, the permitted maximum of the consuming power of the precharge resistor 11 may return to equal the limit power P1 again. During the time period from the timing t3 to t4, the bus capacitor Cbus stops being charged, and the bus voltage Vbus is constant. In an embodiment, the bus voltage Vbus may decrease slightly. During the time period from the timing t4 to t5, the precharge switch 12 is in the on state, the bus capacitor Cbus is charged, and the bus voltage Vbus increases. For the same reason, the variation trend of the consuming power of the precharge resistor 11 during the time period from the timing t4 to t5 is the same as that during the time period from the timing t0 to t1 and the time period from the timing t2 to t3. It could be understood that the times of switching the precharge switch 12 between the on state and the off state during the load circuit 20 being in the precharge mode are not limited to that shown in FIG. 5 and can be adjusted according to actual requirements of the precharge system.

From the above descriptions, during the time period A (i.e., the time period from the timing t0 to t1, the time period from the timing t2 to t3, and the time period from the timing t4 to t5), the precharge resistor 11 works and gradually accumulates the thermal energy therein, and the permitted maximum of the consuming power of the precharge resistor 11 decreases gradually toward the threshold power P2. During the time period B (i.e., the time period from the timing t1 to t2, the time period from the timing t3 to t4, and the time period after the timing t5), the precharge resistor 11 stops working and dissipates heat, and the permitted maximum of the consuming power of the precharge resistor 11 increases gradually toward the limit power P1. In an embodiment, the permitted maximum of the consuming power of the precharge resistor 11 may return to equal the limit power P1. Therefore, through controlling the precharge switch 12 to switch between the on state and the off state, the precharge resistor 11 intermittently works with the consuming power which is larger than the threshold power P2 and is smaller than or equal to the limit power P1. Accordingly, when the precharge resistor 11 works, the consuming power of the precharge resistor 11 is maintained at a power level which is close to the limit power P1. By the precharge method of the present disclosure, the precharge system 1 is allowed to employ the precharge resistor 11 with low rated power so as to reduce the volume and cost of the precharge resistor 11, and it is faster for the precharge system 1 to complete the precharging. In addition, since the precharge resistor 11 dissipates heat intermittently, the reliability of the overall system is improved.

In addition, in the precharge method of the present disclosure, it can be preset that the load circuit 20 in the precharge mode enters the work mode automatically while a specific condition is satisfied. The specific condition may be that the time length of the load circuit 20 being in the precharge mode reaches a preset time length, or that the times of switching the precharge switch 12 reach preset times, but not limited thereto. Moreover, the precharge method of the present disclosure can determine whether to control the load circuit 20 in the precharge mode to enter the work mode in real time. The basis of determining whether to control the load circuit 20 in the precharge mode to enter the work mode is not limited and can be decided according to actual application environments and requirements. For example, in an embodiment, the bus voltage Vbus is detected in real time, and the load circuit 20 in the precharge mode is controlled to enter the work mode if the bus voltage Vbus is larger than or equal to a preset voltage. Correspondingly, the precharge system 1 further comprises a voltage detector (not shown) electrically connected to the control circuit 30 and the bus capacitor Cbus. In another embodiment, the accumulated time length of the precharge switch 12 being in the on state is accounted in real time, and the load circuit 20 in the precharge mode is controlled to enter the work mode if the accumulated time length is larger than or equal to a preset time length. In further another embodiment, a difference between the bus voltage Vbus and the input voltage on the input terminal 21 is calculated in real time, and the load circuit 20 in the precharge mode is controlled to enter the work mode if the difference is smaller than or equal to a preset value. Further, the timing and frequency of determining whether to control the load circuit 20 in the precharge mode to enter the work mode is not limited.

Moreover, the specific time length of the time periods A and B shown in FIG. 4 are not limited and only have to ensure that the consuming power of the precharge resistor 11 is always larger than the threshold power P2 and smaller than or equal to the limit power P1. It is noted that the time periods A and B only represent the time period of the precharge switch 12 being in the on state and the off state respectively, and it is unnecessary to make the time length of each time period A or B the same.

Furthermore, in the precharge method of the present disclosure, the time length of the time periods A and B can be set in advance so as to simplify the switching control for the precharge switch 12, but not exclusively. In an embodiment, the precharge method of the present disclosure can adjust the time length of each time period A or B in real time. For example, when the load circuit 20 is in the precharge mode, the precharge method further comprises steps of detecting a temperature of the precharge resistor 11 and controlling the time length of the precharge switch 12 being in the on and off state according to the temperature of the precharge resistor 11. Correspondingly, the precharge system 1 further comprises a temperature sensor (not shown) electrically connected to the control circuit 30 and the precharge circuit 10. The particular steps are described in detail as follows. Firstly, the precharge switch 12 is controlled to be in the on state, and a first temperature of the precharge resistor 11 is detected. Then, the first temperature of the precharge resistor 11 is compared with a first threshold temperature, and the precharge switch 12 is controlled to switch from the on state to the off state if the first temperature of the precharge resistor 11 is larger than or equal to the first threshold temperature. Afterwards, the precharge switch 12 is maintained in the off state, and a second temperature of the precharge resistor 11 is detected. Then, the second temperature of the precharge resistor 11 is compared with a second threshold temperature, and the precharge switch 12 is controlled to switch from the off state to the on state if the second temperature of the precharge resistor 11 is smaller than or equal to the second threshold temperature. Finally, the above steps are repeated until the load circuit 20 in the precharge mode enters the work mode. In an embodiment, the first threshold temperature is higher than the second threshold temperature.

In an embodiment, when the precharge switch 12 switches between the on state and the off state, the limit power P1 of the precharge resistor 11 may vary dynamically. The limit power P1 may be determined according to the type of the precharge resistor 11 and the time length of the precharge switch 12 being in the on state each time.

In an embodiment, when the precharge switch 12 switches between the on state and the off state, the threshold power P2 can be adjusted dynamically. The threshold power P2 may be determined according to the times of switching the precharge switch 12 between the on state and the off state, the time length of the precharge switch 12 being in the on state each time, the time length of the precharge switch 12 being in the off state each time, the temperature coefficient of the precharge resistor 11, and the condition of dissipating heat.

In addition, when the precharge system 1 breaks down, the precharge method of the present disclosure is able to discover and shut down the system in time. For example, in an embodiment, under the circumstance that the load circuit 20 is in the precharge mode and the times of switching the precharge switch 12 between the on state and the off state is equal to preset times, if the bus voltage Vbus is smaller than a preset voltage and a difference between the bus voltage Vbus and the input voltage is larger than a preset value, the load circuit 20 in the precharge mode is controlled to enter a breakdown mode, and the precharge system 1 is shut down.

Figure 6:
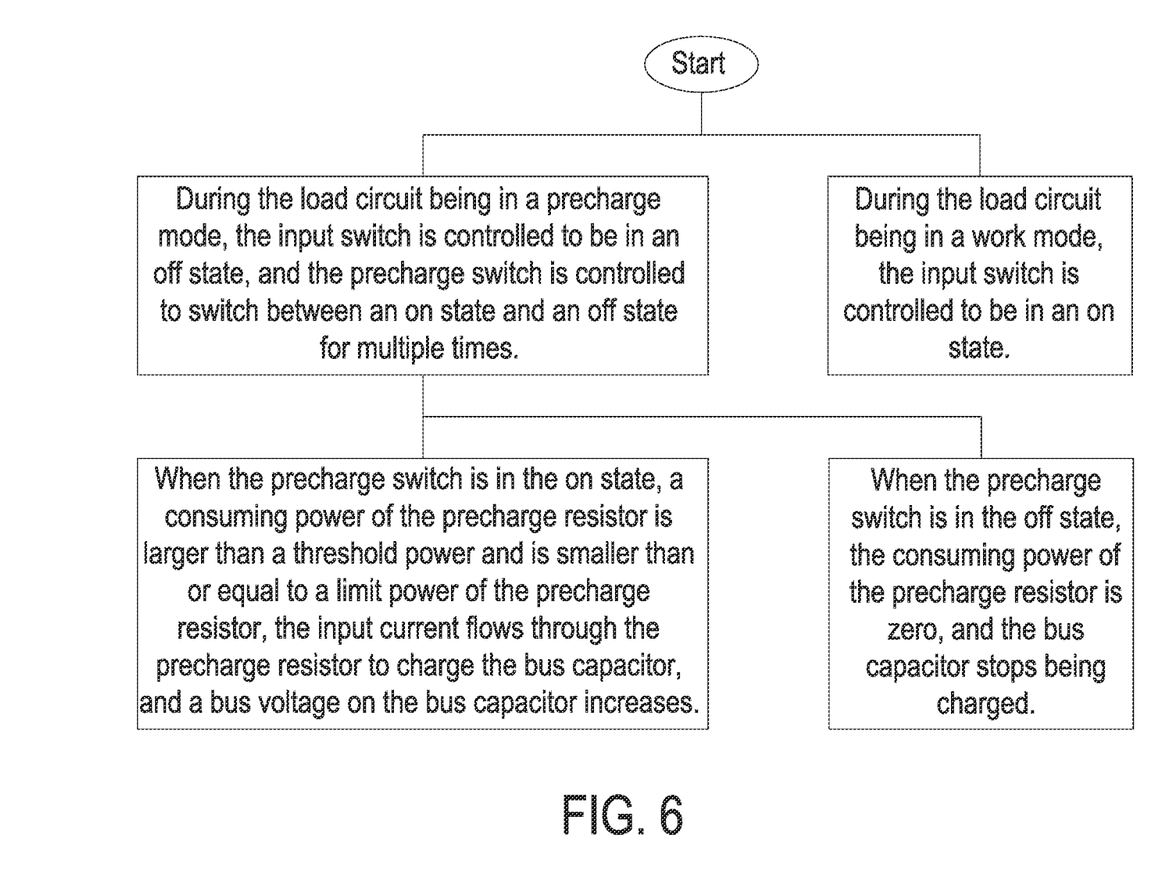
FIGS. 6 and 7 are schematic flow charts illustrating a precharge method according to an embodiment of the present disclosure.

FIG. 6 is a schematic flow chart illustrating a precharge method according to an embodiment of the present disclosure. The precharge method can be applied to the precharge system 1 described above. In the precharge method, as shown in FIG. 6, during the load circuit 20 being in a precharge mode, the input switch 22 is controlled to be in an off state, and the precharge switch 12 is controlled to switch between an on state and an off state for multiple times. In particular, when the precharge switch 12 is in the on state, a consuming power of the precharge resistor 11 is larger than a threshold power P2 and is smaller than or equal to a limit power P1 of the precharge resistor 11, the input current flows through the precharge resistor 11 to charge the bus capacitor Cbus, and a bus voltage Vbus on the bus capacitor Cbus increases. When the precharge switch 12 is in the off state, the consuming power of the precharge resistor 11 is zero, and the bus capacitor Cbus stops being charged. In addition, during the load circuit 20 being in a work mode, the input switch 22 is controlled to be in an on state.

Figure 7:
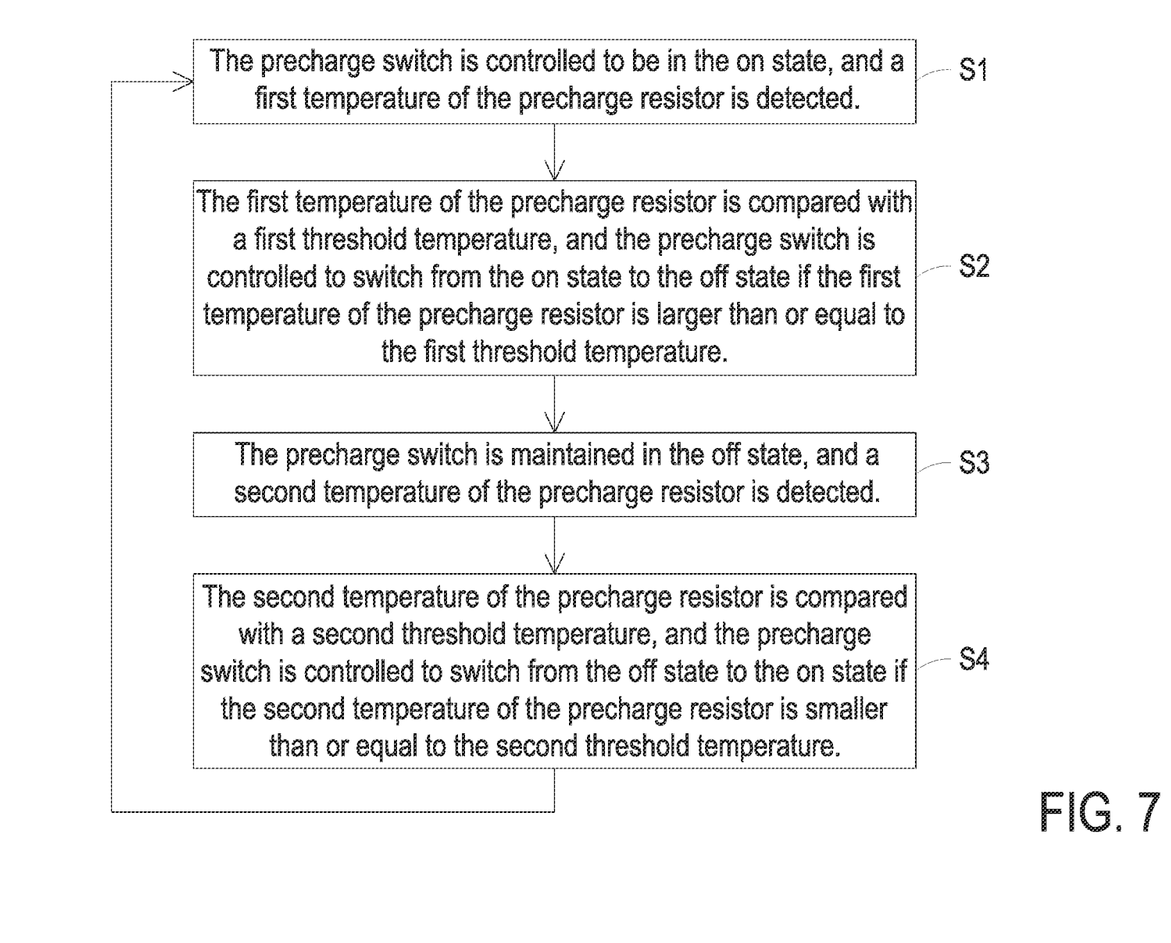

In an embodiment, when the load circuit 20 is in the precharge mode, the precharge method further comprises detecting a temperature of the precharge resistor 11, and controlling a time length of the precharge switch 12 being in the on state and the off state according to the temperature of the precharge resistor 11, which comprises the steps as shown in FIG. 7. Firstly, in Step S1, the precharge switch 12 is controlled to be in the on state, and a first temperature of the precharge resistor 11 is detected. Then, in Step S2, the first temperature of the precharge resistor 11 is compared with a first threshold temperature, and the precharge switch 12 is controlled to switch from the on state to the off state if the first temperature of the precharge resistor 11 is larger than or equal to the first threshold temperature. Then, in Step S3, the precharge switch 12 is maintained in the off state, and a second temperature of the precharge resistor 11 is detected. Finally, in Step S4, the second temperature of the precharge resistor 11 is compared with a second threshold temperature, and the precharge switch 12 is controlled to switch from the off state to the on state if the second temperature of the precharge resistor 11 is smaller than or equal to the second threshold temperature. The steps S1 to S4 are repeated until the load circuit 20 in the precharge mode enters the work mode.

In summary, the present disclosure provides a precharge system and method. Through controlling the precharge switch to switch between an on state and an off state, the precharge resistor intermittently works with a consuming power which is larger than a threshold power and is smaller than or equal to a limit power. Accordingly, when the precharge resistor works, the consuming power of the precharge resistor is maintained at a power level which is close to the limit power. Therefore, the precharge system is allowed to employ the precharge resistor with low rated power so as to reduce the volume and cost of the precharge resistor, and it is faster for the precharge system to complete the precharging. In addition, since the precharge resistor dissipates heat intermittently, the reliability of the overall system is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A precharge method configured to control a precharge system, comprising:
    providing a load circuit and a precharge circuit of the precharge system, wherein the load circuit comprises an input terminal, an input switch and a bus capacitor, the input terminal is configured to receive an input current, the input switch is coupled between the input terminal and the bus capacitor, the precharge circuit is connected in parallel to the input switch and comprises a precharge resistor and a precharge switch connected in series,
    during the load circuit being in a precharge mode, controlling the input switch to be in an off state, and controlling the precharge switch to switch between an on state and an off state for multiple times, wherein when the precharge switch is in the on state, a consuming power of the precharge resistor is larger than a threshold power and is smaller than or equal to a limit power of the precharge resistor, the input current flows through the precharge resistor to charge the bus capacitor, and a bus voltage on the bus capacitor increases, and when the precharge switch is in the off state, the consuming power of the precharge resistor is zero, and the bus capacitor stops being charged; and
    during the load circuit being in a work mode, controlling the input switch to be in an on state,
    wherein when the precharge switch is controlled to switch between the on state and the off state, the threshold power is adjusted dynamically,
    wherein the threshold power is determined according to the times of switching the precharge switch between the on state and the off state, a time length of the precharge switch being in the on state each time, a time length of the precharge switch being in the off state each time, a temperature coefficient of the precharge resistor, and a condition of dissipating heat.

2. The precharge method according to claim 1, wherein when the load circuit is in the precharge mode, the precharge method further comprises:
   detecting a temperature of the precharge resistor; and
   controlling a time length of the precharge switch being in the on state and the off state according to the temperature of the precharge resistor.

3. The precharge method according to claim 2, wherein controlling the time length of the precharge switch being in the on state and the off state according to the temperature of the precharge resistor comprises steps of:
   (S1) controlling the precharge switch to be in the on state, and detecting a first temperature of the precharge resistor;
   (S2) comparing the first temperature of the precharge resistor with a first threshold temperature, and controlling the precharge switch to switch from the on state to the off state if the first temperature of the precharge resistor being larger than or equal to the first threshold temperature;
   (S3) maintaining the precharge switch in the off state, and detecting a second temperature of the precharge resistor;
   (S4) comparing the second temperature of the precharge resistor with a second threshold temperature, and controlling the precharge switch to switch from the off state to the on state if the second temperature of the precharge resistor being smaller than or equal to the second threshold temperature; and
   (S5) repeating the steps S1 to S4 until the load circuit in the precharge mode entering the work mode.

4. The precharge method according to claim 3, wherein the first threshold temperature is larger than the second threshold temperature.

5. The precharge method according to claim 1, wherein when the precharge switch is controlled to switch between the on state and the off state, the limit power varies dynamically.

6. The precharge method according to claim 5, wherein the limit power is determined according to a type of the precharge resistor and a time length of the precharge switch being in the on state each time.

7. The precharge method according to claim 1, wherein when the load circuit is in the precharge mode, the bus voltage is detected in real time, and the load circuit in the precharge mode is controlled to enter the work mode if the bus voltage is larger than or equal to a preset voltage.

8. The precharge method according to claim 1, wherein when the load circuit is in the precharge mode, an accumulated time length of the precharge switch being in the on state is accounted in real time, and the load circuit in the precharge mode is controlled to enter the work mode if the accumulated time length is larger than or equal to a preset time length.

9. The precharge method according to claim 1, wherein when the load circuit is in the precharge mode, a difference between the bus voltage and an input voltage is calculated in real time, and the load circuit in the precharge mode is controlled to enter the work mode if the difference is smaller than or equal to a preset value.

10. The precharge method according to claim 1, wherein under a circumstance that the load circuit is in the precharge mode and the times of switching the precharge switch between the on state and the off state is equal to preset times, if the bus voltage is smaller than a preset voltage and a difference between the bus voltage and an input voltage is larger than a preset value, the load circuit in the precharge mode is controlled to enter a breakdown mode, and the precharge system is shut down.

11. The precharge method according to claim 1, wherein the limit power of the precharge resistor is larger than a rated power of the precharge resistor.

12. A precharge system, comprising a load circuit, a precharge circuit and a control circuit, wherein the load circuit comprises an input terminal, an input switch and a bus capacitor, the input terminal is configured to receive an input current, the input switch is coupled between the input terminal and the bus capacitor, and the precharge circuit is connected in parallel to the input switch and comprises a precharge resistor and a precharge switch connected in series,
   wherein the control circuit is configured to control the input switch to be in an off state and control the precharge switch to switch between an on state and an off state for multiple times during the load circuit being in a precharge mode, and the control circuit is configured to control the input switch to be in an on state during the load circuit being in a work mode,
   wherein when the precharge switch is in the on state, a consuming power of the precharge resistor is larger than a threshold power and is smaller than or equal to a limit power of the precharge resistor, the input current flows through the precharge resistor to charge the bus capacitor, and a bus voltage on the bus capacitor increases, and when the precharge switch is in the off state, the consuming power of the precharge resistor is zero, and the bus capacitor stops being charged,
   wherein when the precharge switch is controlled to switch between the on state and the off state, the threshold power is adjusted dynamically,
   wherein the threshold power is determined according to the times of switching the precharge switch between the on state and the off state, a time length of the precharge switch being in the on state each time, a time length of the precharge switch being in the off state each time, a temperature coefficient of the precharge resistor, and a condition of dissipating heat.

13. The precharge system according to claim 12, wherein when the load circuit is in the precharge mode, the control circuit is configured to:
   detect a temperature of the precharge resistor; and
   control a time length of the precharge switch being in the on state and the off state according to the temperature of the precharge resistor.

14. The precharge system according to claim 13, wherein in order to control the time length of the precharge switch being in the on state and the off state according to the temperature of the precharge resistor, the control circuit performs steps of:
   (S1) controlling the precharge switch to be in the on state, and detecting a first temperature of the precharge resistor;
   (S2) comparing the first temperature of the precharge resistor with a first threshold temperature, and controlling the precharge switch to switch from the on state to the off state if the first temperature of the precharge resistor being larger than or equal to the first threshold temperature;
   (S3) maintaining the precharge switch in the off state, and detecting a second temperature of the precharge resistor;

(S4) comparing the second temperature of the precharge resistor with a second threshold temperature, and controlling the precharge switch to switch from the off state to the on state if the second temperature of the precharge resistor being smaller than or equal to the second threshold temperature; and (S5) repeating the steps S1 to S4 until the load circuit in the precharge mode entering the work mode.

15. The precharge system according to claim 14, wherein the first threshold temperature is larger than the second threshold temperature.

16. The precharge system according to claim 12, wherein when the precharge switch is controlled to switch between the on state and the off state, the limit power varies dynamically.

17. The precharge system according to claim 16, wherein the limit power is determined according to a type of the precharge resistor and a time length of the precharge switch being in the on state each time.

18. The precharge system according to claim 12, wherein when the load circuit is in the precharge mode, the bus voltage is detected in real time, and the control circuit controls the load circuit in the precharge mode to enter the work mode if the bus voltage is larger than or equal to a preset voltage.

19. The precharge system according to claim 12, wherein when the load circuit is in the precharge mode, an accumulated time length of the precharge switch being in the on state is accounted in real time, and the control circuit controls the load circuit in the precharge mode to enter the work mode if the accumulated time length is larger than or equal to a preset time length.

20. The precharge system according to claim 12, wherein when the load circuit is in the precharge mode, a difference between the bus voltage and an input voltage is calculated in real time, and the control circuit controls the load circuit in the precharge mode to enter the work mode if the difference is smaller than or equal to a preset value.

21. The precharge system according to claim 12, wherein under a circumstance that the load circuit is in the precharge mode and the times of switching the precharge switch between the on state and the off state is equal to preset times, if the bus voltage is smaller than a preset voltage and a difference between the bus voltage and an input voltage is larger than a preset value, the control circuit controls the load circuit in the precharge mode to enter a breakdown mode and shuts down the precharge system.

22. The precharge system according to claim 12, wherein the limit power of the precharge resistor is larger than a rated power of the precharge resistor.

* * * * *